(12) United States Patent
Turner (10) Patent No.: US 9,490,630 B2
(45) Date of Patent: Nov. 8, 2016

(54) DESTRUCTIVE ELECTROSTATIC DISCHARGE DAMAGE PREVENTION OF GARMENTS

(71) Applicant: John C. Turner, Putney (AU)

(72) Inventor: John C. Turner, Putney (AU)

( * ) Notice: Subject to any disclaimer, the term of this patent is extended or adjusted under 35 U.S.C. 154(b) by 727 days.

(21) Appl. No.: 13/741,542

(22) Filed: Jan. 15, 2013

(65) Prior Publication Data

US 2013/0182358 A1     Jul. 18, 2013

(51) Int. Cl.
*H02H 9/04*     (2006.01)
*A41D 13/008*   (2006.01)

(52) U.S. Cl.
CPC .............. *H02H 9/04* (2013.01); *A41D 13/008* (2013.01)

(58) Field of Classification Search
CPC ...... H02H 9/04; A41D 13/008; A41D 27/00; A41D 31/00; H05F 1/00; H05F 3/00; A41C 3/12
USPC ......................................................... 361/56
See application file for complete search history.

(56) References Cited

U.S. PATENT DOCUMENTS

| 5,093,965 A | 3/1992 | Mauras et al. |
| 6,488,564 B1 * | 12/2002 | Gray ........................ A41C 3/00 450/1 |
| 2004/0226145 A1 * | 11/2004 | Ouellette ................. A44B 1/14 24/113 MP |

FOREIGN PATENT DOCUMENTS

DE        3835882        4/1990

OTHER PUBLICATIONS

Intellectual Property Office Examination Report Under Section 18(3), dated Jan. 8, 2016.
Intellectual Property Office Examination Report Under Section 18(3), dated Feb. 12, 2016.

* cited by examiner

*Primary Examiner* — Thienvu Tran
*Assistant Examiner* — Kevin J Comber
(74) *Attorney, Agent, or Firm* — Brian C. Trask (57) ABSTRACT

A method and system for the prevention of Destructive Electrostatic Discharge (DED) damage to outer garments caused by triboelectric charge discharging to the wearer's body through a distinct point of discharge at a conductor in contact with or close proximity to the wearer's skin. The method consists of interposing an insulating layer of high dielectric strength at the conductor such that the conductor is insulated from either the skin of the wearer or the outer garment and the circuit of triboelectric charge through the conductor is broken. The system includes a conductor and an insulating layer positioned between the outer garment and the skin of the wearer on either side of the conductor.

24 Claims, 8 Drawing Sheets

DESTRUCTIVE ELECTROSTATIC DISCHARGE DAMAGE PREVENTION OF GARMENTS

TECHNICAL FIELD

The present invention relates to a means of preventing electrostatic discharge damage to clothing in close proximity to metal components in contact with the wearer's body.

BACKGROUND

There is at present a phenomenon of unexplained small holes appearing in outer upper garments of mainly women. These holes generally appear in the area of the navel and are more commonly found in looser fitting tops. A search using a common search engine on the internet brings up thousands of references and reveals numerous chat forums where the effect is discussed.

By way of illustration the following item was published in *The Sydney Morning Herald*—an Australian newspaper on 15 Jan. 2012:

"For years I have been mystified by tiny holes that have appeared in my T-shirts, polo shirts and thin sweaters—dead centre in the belly-button area and often very soon after buying them." writes a baffled . . . , of Redfern. "I thought it was my washing machine but now I'm convinced it's my belt or my jeans, though I haven't gone through a scientific process of elimination. I thought I was alone until I Googled it, and it looks like it's a huge problem. If you enter 'tiny holes in shirts' you'll find a forum that's been attracting opinions since 2009, with no one really sure what the culprit is—belts, trousers, seatbelts, bugs, stomach discharge, counter tops, tables, fabric dye, you name it. I'd be interested to know how widespread these garment-destroying mystery holes are among Column 8 readers' wardrobes"

The problem is clearly a world wide problem and damage to clothing will be measured in hundreds of millions of dollars per annum. Numerous and diverse causes and cures are proposed but none that appear to answer for the majority. The cause as outlined below is not documented and nor is any cure. To understand the cause of the problem it is first necessary to understand the phenomena of triboelectric charge and damaging electrostatic discharge.

The science of static electrical charge generation is well understood and documented in the literature. For the purposes of this application the following summary is relevant. Reference is made in particular to "Triboelectric Generation: Getting Charged" by Ryne C. Allen—Evaluation Engineering 2000.

Static electrical charge can be generated when two surfaces in contact separate. By "in contact" we mean in contact at the molecular level where in general the two surfaces are separated by a distance of less than 4 Angstrom Units. This phenomenon is called triboelectric charging or tribocharging and is caused by the stripping of free electrons (valence electrons or electrons in the outermost shell of a molecule) from one surface to the other when the surfaces separate. Tribocharging results in a non-neutral surface charge on both surfaces. One surface attains a positive and the other a negative surface charge with respect to each other. A voltage difference between the 2 surfaces results. Given the right conditions the voltage difference can be considerable and measured in kilovolts.

The level and polarity of the tribocharge is dependent on a number of factors but importantly including:

The "work function" of each of the materials where the work function is a measure of the difficulty (or energy required) to liberate free electrons from a solid to a point outside the material. Or more simplistically the ease with which free electrons can be stripped from the material. A low work function means a greater ability to give up electrons. Accordingly materials with a greater disparity of work functions will in general result in a greater tribocharge.

The surface area of separation (at the molecular level) of contact between the surfaces. Where a greater separation of surface area will in general result in a greater tribocharge.

Charge backflow where some of the charge imbalance resulting from separation flows back from one material to the other. To the extent that charge backflow occurs the tribocharge will be reduced.

Corona discharge where the potential difference between the 2 surfaces (particularly at surface irregularities) is such that the dielectric strength of the gas between the surfaces is exceeded and charge flows back through a path of ionized gas.

Any resultant tribocharge is also dependent on the presence of moisture both as humidity and as surface moisture whereby charge backflow is increased significantly by the presence of moisture.

A non-exact ranking of the relative ability of various materials to tribocharge is given by the triboelectric series. The triboelectric series lists materials by their propensity to give up or attain electrons when in contact with another material. The list reproduced below has materials with a greater propensity to lose electrons (attain a positive charge) at the top down through neutral to the materials with a greater propensity to gain electrons (attain a negative charge) at the bottom where cotton is about neutral.

TABLE 1

| Triboelectric Series | |
|---|---|
| Positive Charge | Human skin (Dry) |
| | Rabbit Fur |
| | Glass |
| | Human Hair |
| | Nylon |
| | Wool |
| | Silk |
| | Aluminium |
| | Paper |
| No Charge | Cotton |
| | Steel |
| | No Charge |
| | Wood |
| | Hard Rubber |
| | Nickel, Copper |
| | Brass, Silver |
| | Gold, Platinum |
| | Acetate Fibre (Rayon) |
| | Polyester |
| | Cling Film |
| | Acrylic |
| | Polyurethane |
| | Polythene |
| | Polypropylene |
| | PVC |
| | Silicon |
| | Teflon |
| Negative Charge | Silicone Rubber |

In general separating materials further apart from each other on the triboelectric series will result in a greater resultant tribocharge. For example polyester in contact with wool, nylon or silk can generate significant tribocharge but even polyester and cotton are far enough away from each other to generate appreciable tribocharge. Unfortunately the worst effects can involve silk and wool—both delicate and expensive fabrics that can be easily damaged.

The surface area of separation is dependent on the gross surface area of contact, the surface roughness of each surface and the contact force. A low surface roughness implies a greater area of molecular contact per unit of gross surface contact and a higher contact force also implies a greater area of molecular contact per unit of gross area.

Rubbing one surface against another is merely a means of greatly increasing the surface area of contact being separated. To the extent that separation of the surfaces is produced by a rubbing action then the coefficient of friction between the two surfaces is important in that it is a relative measure of the surface roughness between the surfaces.

So in general a higher tribocharge can be expected from rubbing materials together that have a greater separation on the triboelectric series and with higher contact force and with smoother surfaces.

Possibly the most common and well known triboelectric effect is that associated with garments. Most people have experienced an electric shock caused by the discharge of tribocharge when touching the metal surface of a vehicle after getting out of it. The tribocharge arising from the separation of the wearer's outer garment from the car upholstery surface and the electric shock resulting from the discharge to ground. Similarly when removing an outer garment of dissimilar material to an inner garment the crackling of a corona discharge and the electrostatic attraction between the garments may be observed.

Potential exists for a significant tribocharge to be generated between a woman's brassiere and an outer garment in contact with it. Whilst henceforth in this specification we refer to a brassiere we also include inner garments such as singlets and camisoles where the effect can also be observed. In general in a system where surface separation is occurring more or less continually any tribocharge will increase until the combined discharge effect equals the charge effect when the system will reach a steady state. At steady state a circuit can exist with electrons transferring from one surface to the other and then back to the original surface through the skin (a good conductor) of the wearer. It follows that the points of contact between the outer garment and the skin of the wearer can become part of the circuit with the electron flow taking the route of least resistance. The tribocharge arising from such intergarment contact will be affected by the following:

- The separation of the outer material of the brassiere and the outer garment on the triboelectric series. A greater separation will in general result in a greater charge.
- The extent to which the 2 garments rub or slide together. More relative surface movement will result in a greater tribocharge.
- The moisture content of the garments and the relative humidity of the surrounding air.
- The relative surface roughness or coefficient of friction between the brassiere and outer garment.
- The contact force between the garments.

The tribocharge generated between the fabrics can be in the order of thousands of volts. An experiment carried out to estimate the static electric field generated between dissimilar garments around the breast area as part of the Conundrum Project (cancer6million.org) dealing with the electrophysiology of cancer demonstrated that charges of over 5000 volts could be generated with just 4 distinct rubs between polyester and acrylic fabrics. Whilst not in any way connected to the problem herein discussed the potential for large tribocharges was clearly demonstrated. Continual relative movement or rubbing will generate even larger charges. Where the outer garment is tucked in, in contact with the skin or in very close proximity to it over a large surface area the tribocharge can dissipate harmlessly over a large area back to the body.

U.S. Pat. No. 6,488,564 describes a system for reducing electrostatic fields in the breast area that might cause tissue damage by using electrically conductive electrostatic field concentrators adapted to ionize air molecules in the vicinity and thereby reduce electrostatic fields. This citation describes voltages measured between brassiere and outer garment of thousands of volts.

When the outer garment remains loose and is not forced into skin contact the tribocharge can increase significantly. Furthermore at any distinct points of discharge the tribocharge can concentrate (in the manner of a lightning rod) and corona discharge can occur. Corona discharge not only results in the removal of material from both electrodes in the manner of spark erosion but also generates extremely high temperatures associated with the plasma generated by the discharge. As a consequence the fabric in close proximity to the discharge is damaged by the combined effect of spark erosion and heat. The dielectric strength of air is approximately 3 kvolts/mm. Accordingly a triboelectric potential difference of only 5000 volts could result in a spark jumping nearly 2 mm at a distinct discharge point.

A distinct discharge point can be formed when any conductor is in contact or even in close proximity to the skin. Such a conductor might take the form of a metal stud or similar such as exists at the top of the fly on a pair of jeans. These studs can be pressed against the skin or against underwear and in close proximity to the skin on the one side and be in close proximity to the outer garment on the other side. The conditions necessary for a corona discharge at a conductor are easily attained and a destructive electrostatic discharge (DED) (as defined herein) occurs. Whilst the metal stud on jeans is a common site of DED any conductor between the outer garment and the skin can become a site of DED; for example metal clips on brassiere straps and belt buckles. It should be noted that it is not necessary that the conductor be in absolute contact with the skin but may only need to be in close proximity to it. For example if the outer garment and brassiere material are far apart on the triboelectric series such as with polyester and wool or nylon and other conditions are favourable there may be a corona discharge between outer garment and conductor and then between conductor and skin. Such could occur with a metal belt buckle not in skin contact. However the exposed metal stud on jeans appears to be the most common conductor and frequently it is pressed against the wearer's skin.

Fashion trends, changes in body shape and the more prevalent use of synthetic fabrics have resulted in DEDs becoming a widespread problem. Some specific factors include:

- The move away from cotton as a brassiere material and it's replacement by synthetics (especially polyester) which are further toward the ends of the triboelectric series and therefore more prone to result in a larger difference on the triboelectric series of the materials in contact.
- The use of slightly padded more comfortable brassieres that provide an insulating layer between the outer brassiere layer and the skin thus reducing charge backflow that would reduce tribocharge.

The widespread practice of leaving outer garments hanging loose rather than being tucked in.

The more prevalent use of smooth surfaced brassieres as opposed to patterned rougher surfaces More figure fitting outer garments resulting in higher contact forces between the brassiere and the outer garment at the bust area and also at the midriff.

Increased body weight resulting in:
  closer proximity of outer garment to metal studs, metal buckles or other metal objects at the midriff,
  closer proximity and better electrical contact between the skin and the metal studs, buckles etc at the midriff.

It is an object of the present invention to address or ameliorate some of the above disadvantages and limitations or to at least provide the public with a useful choice.

DEFINITIONS

In order that the invention described herein may be more fully understood, the following definitions are provided for the purposes of the disclosure:

Destructive Electrostatic Discharge (DED)

By "destructive electro static discharge" or DED we mean any discharge of static electricity that causes damage to a garment as it is worn.

Brassiere

By brassiere we also include any inner garment worn between the skin and an outer garment. Throughout this specification the terms brassiere and inner garment are used interchangeably.

Outer Garment

By outer garment we mean any garment worn outside an inner garment whether or not there may be a further garment worn on the outside of said outer garment.

Metal Stud

By metal stud we mean a conductive stud passing through a garment and providing a conductive path from the internal skin side of the garment to the external surface of the garment used in the manner of a button and typically found fastening the waistband of a pair of jeans or the like. For the purposes of this specification we include all similar conductors providing such a conductive path within the term metal stud.

Contact Disrupting Layer

By contact disrupting layer (CDL) we mean a discontinuous layer of material fixed to the outer surface of the outer layer of fabric of an inner garment that is raised such that it is interposed between the outer surface of an inner garment and the inner surface of an outer garment in the areas where the two surfaces are likely to rub together and will disrupt the contact between the surfaces. The purpose of the CDL being to reduce the contact force between the outer surface of the inner garment and the inner surface of the outer garment and to increase coefficient of friction between the two garments in order to reduce triboelectric charge generation.

Note

The term "comprising" (and grammatical variations thereof) is used in this specification in the inclusive sense of "having" or "including", and not in the exclusive sense of "consisting only of".

SUMMARY OF INVENTION

In a broad form of the invention there is provided a method for the prevention of Destructive Electrostatic Discharge (DED) damage to outer garments caused by triboelectric charge discharging to the wearer's body through a distinct point of discharge at a conductor in contact with or close proximity to the wearer's skin wherein the method consists of interposing an insulating layer of high dielectric strength at the conductor such that the conductor is insulated from either the skin of the wearer or the outer garment and the circuit of triboelectric charge through the conductor is broken.

In another broad form of the invention there is provided a system for the prevention of DED damage to outer garments at a distinct point of discharge at a conductor in contact with or close proximity to the wearer's skin and in close proximity to the wearer's outer garment, the system comprising an insulating layer positioned between the outer garment and the skin of the wearer on either side of the conductor.

Preferably the conductor is a metal stud.

Preferably the insulating layer has a high dielectric strength such that the thickness of the layer can be kept to a minimum.

Preferably the insulating layer is rubber.

Preferably the insulating layer is held in position by means of adhesive between the insulating layer and/or the supporting fabric of the metal stud.

Preferably the insulating layer is self adhesive.

Preferably the adhesive is heat setting such that the insulating layer can be ironed on to the back face of the metal stud and/or the supporting fabric.

Preferably the insulating layer is a rubberised fabric.

Preferably the rubberised fabric is single sided with rubber on one side only.

Preferably the insulating layer is held in place by means of encapsulating it between the supporting fabric of the conductor and a further layer of fabric stitched to the supporting layer.

Preferably the insulating layer is held in place by means of encapsulating it between the supporting fabric of the conductor and a further layer of fabric adhering to the supporting layer.

Preferably the further layer of fabric is self adhesive.

Preferably the adhesive is heat setting.

Preferably the insulating layer is provided by an insulating clip held in place on a supporting ply of fabric such that it interposes the insulating layer between the conductor and the wearer's skin.

Preferably the clip is held in place partially or fully by engagement with the conductor.

Preferably the clip consists of a horseshoe shaped spring with 2 opposing plate-like elements.

Preferably one of the elements is in the form of 2 legs with a slot between the legs such that the clip can slide over the shank of a metal stud such that the opposite element of the clip completely covers the back of the stud and the engagement of the slot with the shank of the stud prevents relative movement Preferably one of the elements is in the form of a hook that engages with the shank of a metal stud such that the opposite element of the clip completely covers the back of the stud and the engagement of the hook with the shank of the stud prevents relative movement.

Preferably surface irregularities are formed on at least one of the inside surfaces of the two opposing elements in order to increase the frictional force between the clip and the supporting fabric so as to prevent the clip from working its way off.

Preferably the surface irregularities are serrations configured such that the clip will slide onto the supporting fabric easily but will resist movement in the opposite direction.

Preferably the clip is made from a strong and stiff plastic such as glass reinforced nylon.

Preferably clips are manufactured in a range of colours in order that they can be used with different coloured clothing.

Preferably the clip is patterned, embossed or printed to improve visual appeal.

Preferably the insulating layer is formed by substituting the metal stud with a stud manufactured from an insulating material.

Preferably the insulating material is a strong and durable plastic such as glass reinforced nylon.

Preferably a metal veneer is fixed to the visible side of the stud thereby giving the appearance of a metal stud.

Preferably the metal veneer is crimped to the stud.

Preferably the metal veneer is fixed to the stud by means of adhesive.

Preferably the rubber coating of the single sided rubberised fabric is also a heat setting adhesive.

In another broad form of the invention there is provided a method for the prevention of DED damage to outer garments caused by triboelectric charge generation between an inner garment and an outer garment wherein the method consists of providing a contact disrupting layer (CDL) fixed to the outer surface of the outer fabric of an inner garment and wherein the CDL is non-continuous such that the inner surface of an outer garment is in contact with the CDL and outer surface of an inner garment simultaneously in the regions that the surfaces rub together.

Preferably the inner garment is a brassiere.

Preferably the CDL is manufactured from a material close to the neutral point in the triboelectric series such as cotton.

Preferably the CDL consists of an at least one set of lines of stitching projecting above the outer surface of the inner garment.

Preferably the CDL projects a distance of less than 1 mm above the surface of the inner garment.

Preferably the distance between the lines of the at least one set of lines is less than 15 times the distance the CDL projects.

Preferably the distance between the lines of the at least one set of lines is greater than 5 times the distance the CDL projects.

Preferably the CDL is manufactured from a conductive material such that it forms a conductive layer on the outer surface of the inner garment in electrical contact with the inner surface of the outer garment where the inner and outer garment surfaces rub together such that triboelectric charge can dissipate freely between the surfaces.

Preferably the conductive layer is connected by a conductive path to the wearer's skin.

In another broad form of the invention there is provided a system for the prevention of DED damage to an outer garment through triboelectric charge between the outer garment and a brassiere, the system comprising an at least one contact disrupting layer (CDL) fixed to the outer surface of the brassiere and wherein the CDL is non-continuous such that the inner surface of the outer garment is in contact with the CDL and outer surface of the brassiere simultaneously in the regions that the surfaces rub together.

Preferably the CDL is manufactured from a material close to the neutral point in the triboelectric series such as cotton.

Preferably the CDL consists of an at least one set of lines of stitching projecting above the outer surface of the inner garment.

Preferably the CDL projects a distance of less than 1 mm above the surface of the inner garment.

Preferably the distance between the lines of the at least one set of lines is less than 15 times the distance the CDL projects above the surface of the inner garment.

Preferably the distance between the lines of the at least one set of lines is greater than 5 times the distance the CDL projects above the surface of the inner garment.

Preferably the CDL is manufactured from a conductive material that forms a conductive layer attached to the outer surface of the brassiere and in contact with the inner surface of the outer garment where the 2 garments rub together.

Preferably the conductive layer is non-continuous such that the inner surface of the outer garment is in contact with the conductive layer and outer surface of the brassiere simultaneously in the regions that the surfaces rub together.

Preferably the conductive layer has a small surface area in contact with the outer garment in order to minimize any triboelectric effect between the conductive layer and the outer garment.

Preferably the conductive layer projects above the outer surface of the brassiere such that electrical contact with the outer garment is enhanced and or the coefficient of friction between the brassiere and the outer garment is increased.

Preferably the conductive layer is formed by means of stitching through the outer fabric of the brassiere with conductive thread.

Preferably the conductive thread is manufactured from carbon fibre.

Preferably the conductive layer is electrically connected to the wearer's skin through a conductor.

Preferably the conductor is conductive thread.

Preferably the conductive thread is manufactured from carbon fibre.

Preferably the supporting straps of the brassiere are conductive and provide the contact with the wearer's skin.

Preferably the supporting straps are manufactured from or incorporate conductive thread.

Preferably the conductive thread is manufactured from carbon fibre.

In another broad form of the invention there is provided a method for the prevention of DED damage to outer garments caused by triboelectric charge generation between an inner garment and an outer garment wherein the method consists of providing a conductive layer on the outer surface of the inner garment in electrical contact with the inner surface of the outer garment where the surfaces of the inner garment and outer garment rub together such that triboelectric charge can dissipate freely between the surfaces.

Preferably the conductive layer is connected by a conductive path to a wearer's skin.

In another broad form of the invention there is provided a system for the prevention of DED damage to an outer garment through triboelectric charge between the outer garment and a brassiere, the system comprising a conductive layer attached to the outer surface of the brassiere and in contact with the inner surface of the outer garment where the garments rub together.

In another broad form of the invention there is provided a method of minimising fabric damage in a garment worn by a user; the damage postulated to be caused by electrostatic discharge concentrated at a region of the garment; the method comprising introducing a return path for electrostatic buildup whereby charge is conducted from the garment to skin of the user so that electrostatic discharge at the region is reduced below a predetermined threshold sufficient to minimise the damage.

Preferably the return path is at or near the region.

Preferably the return path is at or near an area of generation or buildup of electrostatic charge on the garment.

Preferably the method further includes the step of inserting a conductive material in the garment so as to form the return path.

Preferably the conductive material is a metal.

Preferably the conductive material is a conductive thread.

In another broad form of the invention there is provided a method of minimising fabric damage in a garment worn by a user; the damage postulated to be caused by electrostatic discharge concentrated at a region of the garment; the method comprising introducing resistance so that electrostatic discharge at the region is reduced below a predetermined threshold sufficient to minimise the damage.

Preferably the resistance is at or near the region.

Preferably the resistance is at or near an area of generation or buildup of electrostatic charge on the garment.

BRIEF DESCRIPTION OF DRAWINGS

Embodiments of the present invention will now be described with reference to the accompanying drawings wherein.

DESCRIPTION OF EMBODIMENTS

Figures 1, 1A:
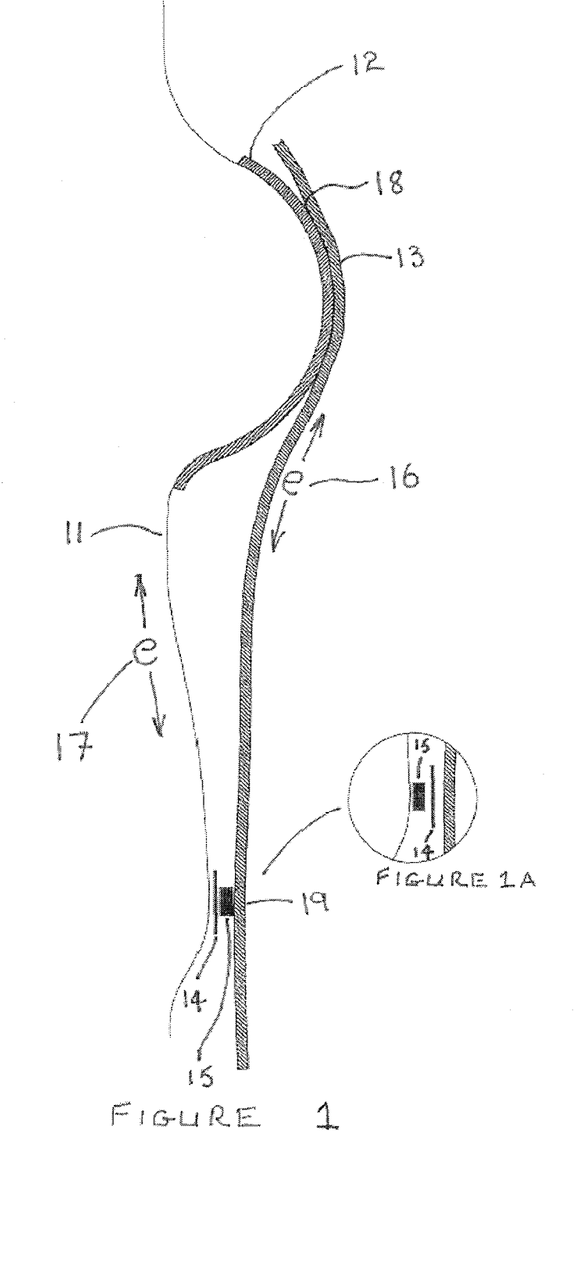
FIG. 1 is a schematic representation of a potential triboelectric charge circuit involving an outer garment and an inner garment in the form of a brassiere.
FIG. 1A is a schematic representation of an alternative positioning of an insulating layer in the triboelectric charge circuit of FIG. 1.

With reference to FIG. 1 there is shown a potential triboelectric charge circuit interrupted by an insulating layer 14. Brassiere (or inner garment) material 12 rubs against outer garment 13 at interface 18 generating a triboelectric charge. Were it not for the presence of insulating layer 14 between the wearer's skin 11 and conducting item 15, electrons 16, 17 would flow through circuit of the outer garment, conducting item, skin and brassiere material. Electron flow could be in either direction depending on relative positions of the brassiere material 12 and the outer garment 13 on the triboelectric series. The electron flow could result in DED damage to outer garment 13 in proximity to conducting item 15 at region 19. Interposing insulating layer 14 between conducting item 15 and wearer's skin 11 breaks the circuit and prevents DED damage to outer garment 13.

With reference now to FIG. 1A there is shown an alternate positioning of insulating layer 14 whereby it is interposed in the circuit on the outer side of conducting item 15.

Conducting item 15 can be any item made from a conductive material in contact with or in close proximity to the wearer's skin and in close proximity to outer garment 13 and might take any form such as but not limited to a stud, button, clip, buckle, chain, decorative item.

Still with reference to FIG. 1 the DED damage at region 19 can be eliminated by substitution of conducting item 15 with an item of similar functionality but manufactured from a non-conductive material thereby eliminating the need for separate insulating layer 14.

Figures 2, 2A:
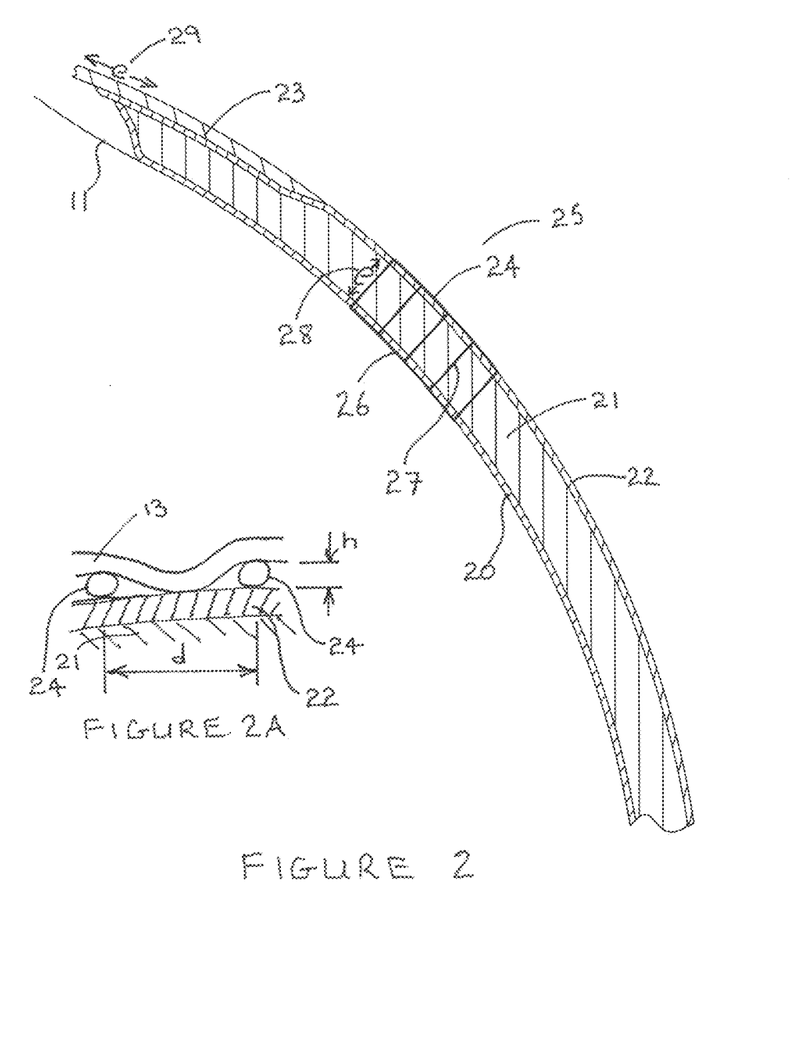
FIG. 2 is a cross section of a portion of a brassiere illustrating means to ground the external face of said brassiere.
FIG. 2A is a cross section of a CDL between an inner and an outer garment.

Now with reference to FIG. 2 there is shown in cross section a portion of a brassiere (or inner garment) 25 held against the skin 11. Supporting straps 23 attach to each side of the brassiere and continue over the shoulder and or around the torso to the back (not shown). The supporting straps also being held against the wearer's skin. By way of non limiting example only brassiere construction is typical outer fabric 22 separated from inner fabric 20 by means of intermediate layer 21. This construction being of the type most likely to lead to higher tribocharges however alternative constructions including single fabric layer construction can still generate appreciable tribocharges.

Still with reference to FIG. 2 there is shown a preferred form of the invention where an at least one CDL as defined herein, 24 is fixed to the outer surface of the outer fabric 22. The CDL being non-continuous such that the inner surface of the outer garment (not shown) is in contact with the CDL and outer surface of outer fabric 22 simultaneously in the regions that the surfaces rub together. Thus coefficient of friction is increased and contact force is decreased between the surfaces thereby reducing the intersurface contact area and force and thus the tribocharge generated as the two surfaces rub together. Preferably the CDL is manufactured from a material close to the neutral point in the triboelectric series such as cotton.

Now with reference to FIG. 2A and by way of non limiting example only there is shown in cross section a CDL consisting of an at least one set of lines of stitching 24 of effective height h and pitch d fixed to outer surface of outer fabric 22 and forcing the inner surface of fabric of outer garment 13 away from the outer surface of outer fabric 22 of inner garment. Height h and pitch d being chosen to optimize coefficient of friction increase and intersurface contact decrease whilst still minimizing the surface area of CDL in contact with the outer garment and remaining acceptable aesthetically. The orientation of the lines being chosen such that they are generally at right angles to the likely direction of rubbing between the garments.

Preferably, where likely direction of rubbing is unknown or can be in different directions under different circumstances a pattern of lines can be used.

Preferably the pattern consists of a plurality of sets of intersecting lines at different orientations.

Preferably h is less than 1 mm.

Preferably the ratio d/h is greater than 5.

More preferably the ratio d/h is between 5 and 15.

Still with reference to FIG. 2, in a further preferred form of the invention an at least one CDL 24 is manufactured from a conductive material and forms a conductive layer in electrical contact with the outer surface of the outer fabric 22. The conductive layer being non-continuous such that the inner surface of the outer garment (not shown) is in contact with conductive layer 24 and outer surface of outer fabric 22 simultaneously in the regions that the surfaces rub together. Thus free electrons generated through tribocharging between outer garment (not shown) and outer fabric 22 can dissipate between the surfaces through the conductive layer. The triboelectric charge being reduced through the mechanism of charge back flow in addition to the mechanisms of coefficient of friction increase and contact force reduction.

Preferably the conductive layer has a small surface area in contact with the outer garment in order to reduce any potential tribocharge between the conductive layer and the outer garment.

Preferably the conductive layer is formed by means of stitching through the outer fabric of 22 of the brassiere with conductive thread.

Preferably the conductive layer projects above the surface of the outer fabric such that electrical contact with the outer garment is enhanced.

Preferably the conductive thread is manufactured from carbon fibre.

Still with reference to FIG. 2 in a preferred embodiment of the invention an at least one conductive path is established between the outer fabric 22 and the wearer's skin 11 whereby an at least one conductive layer 24 on the outer fabric 22 is connected to an at least one conductive layer 26 on inner fabric 20 by means of an at least one (5 shown) conductor 27. Free electrons 28 generated through triboelectric charging can thus travel to or from the outer fabric and the wearer's outer garment from or to the wearer's skin through the conductive path. By this means the outer fabric 22 and the outer garment is grounded to the same potential as the wearer's skin. The triboelectric charge being reduced through the mechanism of charge flow to the wearer's body in addition to the mechanism of charge backflow and in addition to the mechanisms of coefficient of friction increase and contact force reduction.

Preferably there is a plurality of the conductive paths positioned in regions where the brassiere outer fabric rubs against the outer garment (not shown).

Preferably the at least one conductive path is formed by means of stitching through the entire fabric (inner, intermediate and outer layers in combination) of the brassiere with conductive thread.

Preferably the conductive thread is manufactured from carbon fibre.

Still with reference to FIG. 2 there is shown another preferred form of the invention whereby the supporting straps 23 are themselves conductive and are in electrical contact with the outer fabric 22. Free electrons 29 generated through triboelectric charging can thus travel to or from the outer fabric from or to the wearer's skin through the conductive supporting strap. By this means the outer fabric 22 is grounded to the same potential as the wearer's skin.

Preferably the supporting straps are made conductive by being manufactured from or incorporating conductive thread.

Preferably the conductive thread is manufactured from carbon fibre.

In a preferred embodiment of the invention conductive straps 23 in turn connect with an at least one conductive layer 24 on the outer fabric 22 thereby enhancing the grounding effect.

Preferably the conductive layer consists of stitching with conductive thread.

Preferably the conductive thread is manufactured from carbon fibre.

Figure 3:
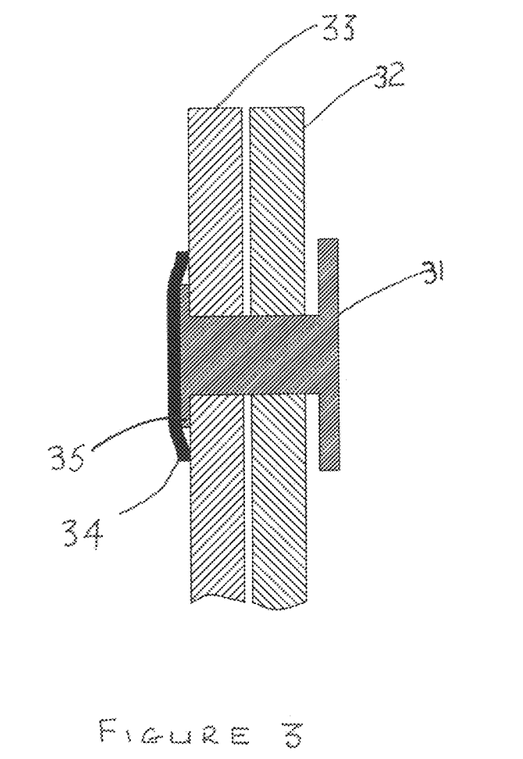
FIG. 3 is a cross section of a metal stud with insulation layer adhered to the back side.

With reference to FIG. 3 and by way of non-limiting example there is shown a preferred form of the invention wherein metal stud 31 is fixed in the supporting inner ply of fabric 33 of a lower garment such as a pair of jeans and holding in place the outer ply 32 of the lower garment. Held in place against the back flange 35 of the stud and projecting beyond the flange is an insulating layer 34. The insulating layer providing insulation against current flow between the wearer's body (not shown) and the wearer's outer garment (not shown). The current flow arising from triboelectric charge.

In one form, the insulating layer 34 is held in place by means of adhesive (not shown).

Preferably the insulating layer has a high dielectric strength such that the thickness of the layer can be low thus avoiding irritation to the wearer.

Preferably the insulating layer is a rubber compound.

Preferably the insulating layer is a rubberised fabric.

More preferably the insulating layer is a single sided rubberised fabric with the rubberised side to the stud and fabric side to the wearer's body such that the wearer is not irritated by a rubber surface.

Preferably the rubber coating on the single sided rubberised fabric is also a heat setting adhesive such that the fabric can be ironed on directly to the supporting inner ply of fabric and/or the back flange of the metal stud.

Preferably the insulating layer 34 is self adhesive such that it can be fixed to the flange 35 and/or the supporting inner ply 33 easily.

More preferably the self adhesive is heat setting such that it can be ironed on to the flange 35 and/or the supporting inner ply 33.

Figure 4:
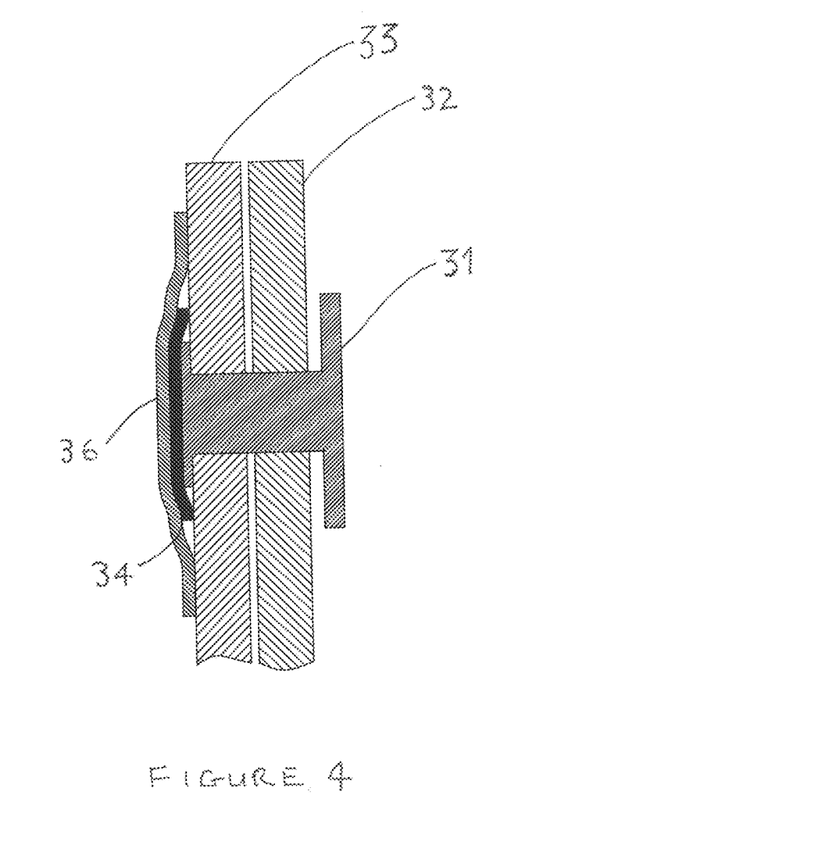
FIG. 4 is a cross section of a metal stud with insulation layer held in place on the back side by a secondary fabric layer adhering to the supporting garment.

Now with reference to FIG. 4 and by way of non-limiting example there is shown a further preferred form of the invention wherein metal stud 31 is fixed in the supporting inner ply of fabric 33 of a lower garment such as a pair of jeans and holding in place the outer ply 32 of the lower garment similarly to FIG. 3. Held in place against the back flange of the stud by means of a layer of fabric 36 is an insulating layer 4. The layer of fabric 36 held in place on the supporting inner ply of fabric 33 by means of adhesive (not shown).

Preferably the insulating layer has a high dielectric strength such that the thickness of the layer can be low thus avoiding irritation to the wearer.

Preferably the insulating layer is a rubber compound.

Preferably the fabric layer 36 is self adhesive such that it can be fixed to the supporting inner ply 33 easily.

More preferably the adhesive is heat setting such that it can be ironed on to the supporting inner ply of fabric.

In a preferred form of the invention an insulating layer is formed by the body of a stud being made from an insulating material with just a metal veneer on the visible side of the stud thereby giving the appearance of a metal stud but being insulated from the wearer's skin.

Figure 5:
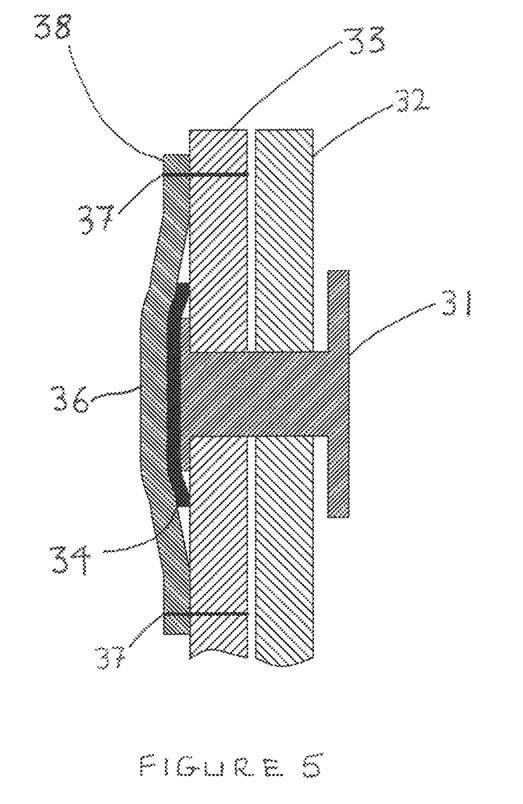
FIG. 5 is a cross section of a metal stud with insulation layer held in place on the back side by a secondary fabric layer stitched to the supporting garment.

Now with reference to FIG. 5 and by way of non-limiting example there is shown a further preferred form of the invention wherein metal stud 31 is fixed in the supporting inner ply of fabric 33 of a lower garment such as a pair of jeans and holding in place the outer ply 32 of the lower garment similarly to FIG. 3. The insulating layer 34 is held in place against the back flange of the stud and encapsulated between a layer of fabric 38 and the supporting inner ply of fabric 33 by means of stitching 38.

Preferably the insulating layer has a high dielectric strength such that the thickness of the layer can be low thus avoiding irritation to the wearer.

Preferably the insulating layer is a rubber compound.

Figure 6:
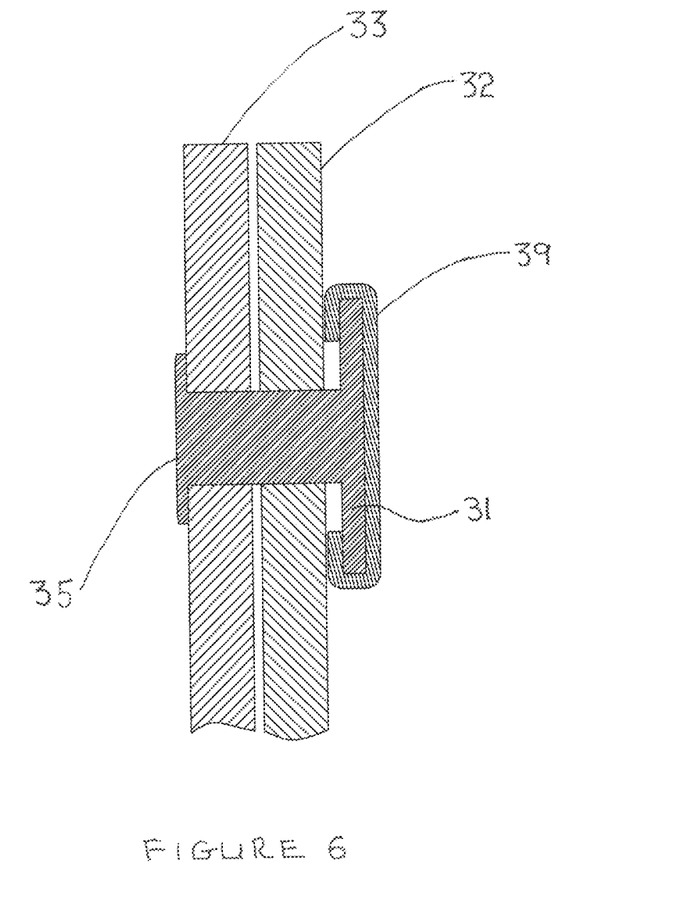
FIG. 6 is a cross section of a non conducting stud with metal skin fixed to the outer flange of the stud.

Now with reference to FIG. 6 and by way of non-limiting example there is shown a preferred form of the invention wherein a stud 31 is made from an insulating material thereby forming an insulating layer fixed in the supporting inner ply of fabric 33 of a lower garment such as a pair of jeans and holding in place the outer ply 32 of the lower garment similarly to FIG. 3. Fixed to the outer flange of the stud is a thin metal layer 39 such that the appearance of the stud is metal. The metal layer 39 may be embossed, engraved or printed in a decorative manner (not shown).

Preferably the thin metal layer is fixed to the outer flange by means of adhesive.

Preferably the insulating material is a strong and durable plastic such as glass reinforced nylon.

Figure 7:
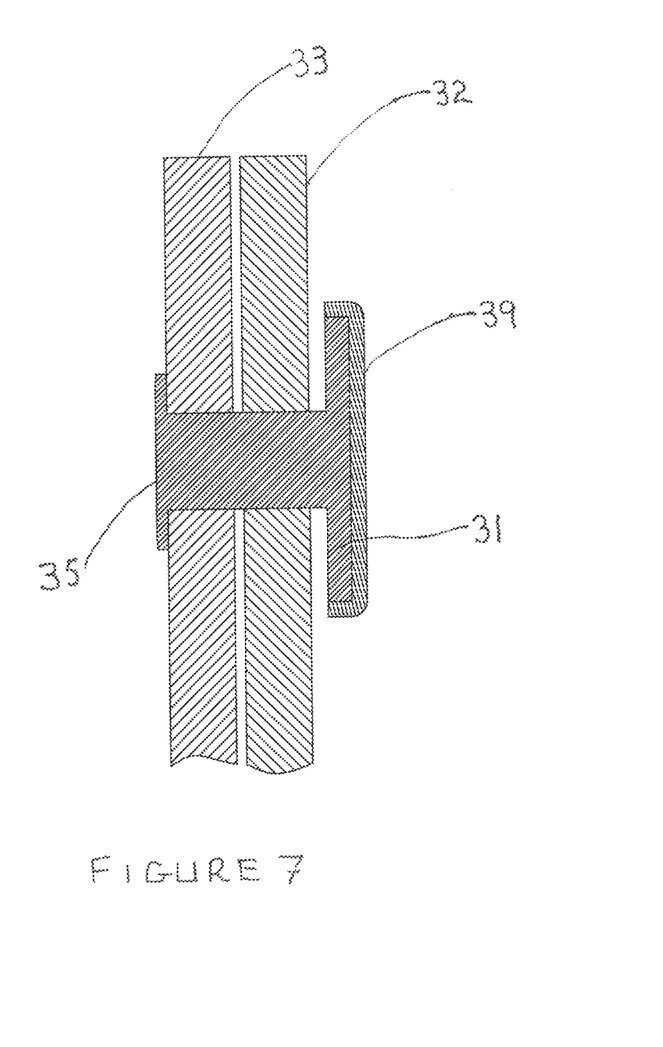
FIG. 7 is a cross section of a non conducting stud with metal skin formed around the outer flange of the stud.

Now with reference to FIG. 7 and by way of non-limiting example there is shown a preferred form of the invention wherein a stud 31 is made from an insulating material thereby forming an insulating layer fixed in the supporting inner ply of fabric 33 of a lower garment such as a pair of jeans and holding in place the outer ply 32 of the lower garment similarly to FIG. 3. Crimped around the outer flange of the stud is a thin metal layer 39 such that the appearance of the stud is metal. The metal layer 39 may be embossed, engraved or printed in a decorative manner (not shown).

Preferably the insulating material is a strong and durable plastic such as glass reinforced nylon.

Figure 8A:
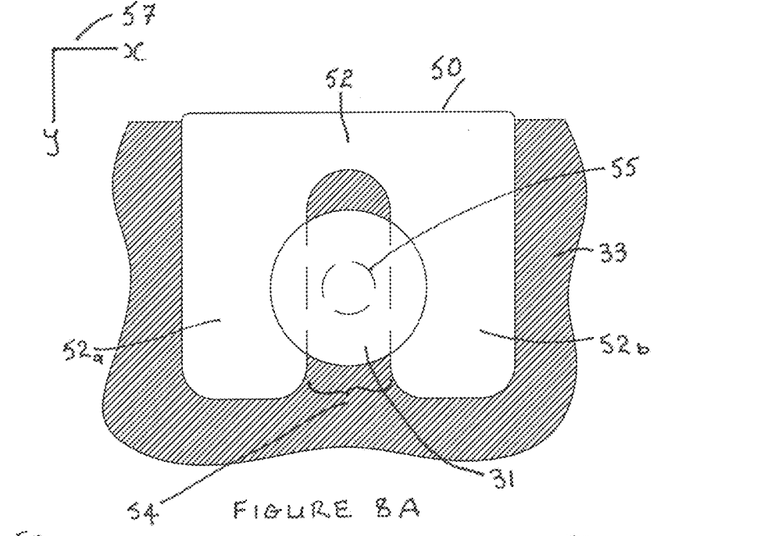
FIG. 8A is an elevation in the X and Y axes of an insulating clip slid over a fabric ply to insulate a conducting stud. The axes X and Y are marked.
Figure 8B:
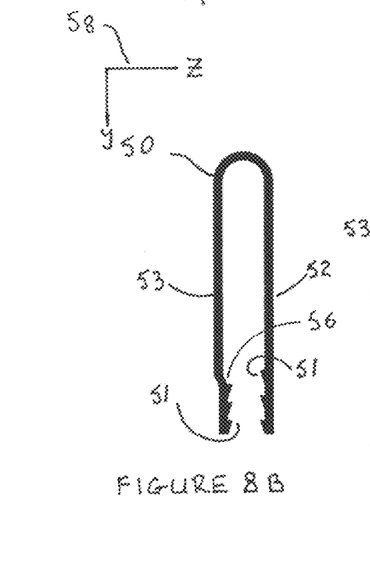
FIG. 8B is a cross section in the Z and Y axes of the insulating clip of FIG. 8A. The axes X and Y are marked.
Figure 8C:
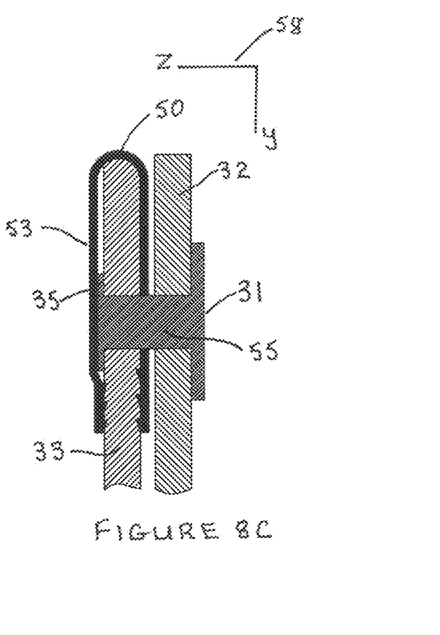
FIG. 8C is a cross section in the Z and Y axes of the insulating clip of FIG. 8A showing its positioning with respect to a conducting stud and the fabric plies fastened by the stud. The axes X and Y are marked.

Now with reference to FIG. 8C and by way of non-limiting example there is shown a preferred form of the invention wherein metal stud 31 (as defined herein) is fixed in the supporting inner ply of fabric 33 of a lower garment such as a pair of jeans and holding in place the outer ply 32 of the lower garment similarly to FIG. 3. An insulating clip 50 manufactured from high dielectric strength material of sufficient width to form an effective insulating layer behind the stud is held in place on the supporting fabric. In this manner an insulating layer is positioned between the stud and the wearer's skin or undergarments thus breaking the discharge circuit. The clip might be of various types of construction with the essential features being only that it provides an insulating layer between the metal stud and the wearer's skin, it remains fixed in position whilst in use and does not cause any discomfort to the wearer.

In a preferred embodiment of this form of the invention the clip is held partially or fully in place by the metal stud itself.

With reference to FIGS. 8B and 8C in a preferred structure and by way of non-limiting example the clip is formed as a horseshoe shaped spring with 2 opposing elements in the manner of a common hair clip. The clip slides over the fabric ply 33 allowing the back element 53 of the clip to slide over and cover the back face of the stud 35. The fabric ply 33 being held compressively between the front element 52 and back element 53 of the clip.

Preferably the insulating clip is made from a strong and stiff plastic such as glass reinforced nylon.

With reference to FIG. 8A in one preferred configuration the insulating clip has front element 52 formed as 2 legs 52*a* and 52*b* with slot 54 between the legs such that the clip can slide over the shank of the stud 55 that thereby prevents the clip from moving across the stud in the X direction as shown by XY axes 57.

In yet another preferred configuration (not shown) the front element of the clip takes the form of an upwards facing hook. The clip being slid on to the supporting fabric with the hook engaging the underside of the shank of the stud. In this manner the stud prevents relative movement of the clip in any direction.

Now with reference to FIG. 8B there is shown a preferred means of anchoring the clip whereby there are a series of surface irregularities 51 opposing each other on either the front inside surface or the back inside surface or both inside surfaces of the front and back elements of the clip. FIG. 8B shows these irregularities on both surfaces. These irregularities grip the fabric ply 33 to prevent the clip from working its way up the fabric in the Y axis as shown by YZ axes 58. These irregularities need only increase the frictional force between the clip and the fabric sufficient to prevent movement whilst in use and might take the form of bumps, spikes, ridges or the like. Preferably the irregularities are serrations that allow the clip to slide onto the fabric ply 33 easily in one direction yet resist movement in the opposite direction.

Still with reference to FIG. 8B there is shown an alternative means of anchoring the clip whereby a recess 56 in the back face of the clip accepts the flange 35 of the stud thereby resisting relative movement in the Y axis as shown by YZ axes 58.

Preferably the clips are manufactured in a range of different colours so that they can be used with different coloured clothing.

Preferably the clips are patterned, embossed, printed or otherwise modified such that they are not simply functional but also have some visual appeal.

In Use

In use the system herein described provides a plurality of methods for the elimination of destructive electrostatic discharge.

By interposing an insulating medium of high dielectric strength between a wearer's triboelectric charged outer garment and their skin at any distinct point of discharge such as at any conductor in contact with or close proximity to the wearer's skin and the wearer's outer garment the circuit can be broken and any DED avoided.

By providing a CDL between the outer surface of an inner garment and the inner surface of an outer garment the tribocharge generated between the two garments can be reduced through the mechanism of coefficient of friction increase and contact force reduction between the two garments.

By providing a conductive path between the outer surface of an inner garment and the inner surface of an outer garment the triboelectric charge between the two garments can be reduced through the mechanism of charge backflow. Additionally by providing electrical contact between the conductive path and the wearer's skin the accumulation of charge can be further reduced.

The above describes only some embodiments of the present invention. Modifications, obvious to those skilled in the art, can be made thereto without departing from the scope and spirit of the present invention.

The invention claimed is:

1. A method for prevention of Destructive Electrostatic Discharge (DED) damage to outer garments caused by triboelectric charge discharging to a wearer's body through a distinct point of discharge at a conductor in contact with a wearer's skin and/or in contact with an inner garment wherein the method consists of interposing an insulating layer of dielectric strength sufficient to prevent corona discharge at the conductor such that the conductor is insulated from the outer garment and a circuit of triboelectric charge through the conductor is broken and wherein said insulating layer is a separate element to the conductor.

2. A system for prevention of DED damage to outer garments at a distinct point of discharge at a conductor in contact with a wearer's skin and/or in contact with an inner garment and beneath a wearer's outer garment and wherein the system comprises an insulating layer interposed between the outer garment and conductor and wherein said insulating layer is a separate element to the conductor and wherein the insulating layer is localized at the conductor.

3. The system of claim 2 wherein the conductor is a metal stud.

4. The system of claim 2 wherein the insulating layer is rubber.

5. The system of claim 2 wherein the insulating layer is held in position by means of adhesive between the insulating layer and the supporting fabric of the conductor and/or the conductor itself.

6. The system of claim 5 wherein the insulating layer is self adhesive.

7. The system of claim 5 wherein the adhesive is heat setting such that the insulating layer can be ironed on to the back face of the metal stud and/or the supporting fabric.

8. The system of claim 2 wherein the insulating layer is manufactured from a rubberised fabric.

9. The system of claim 8 wherein the rubberised fabric is single sided with rubber on one side only.

10. The system of claim 9 wherein the rubber coating of the single sided rubberised fabric is also a heat setting adhesive.

11. The system of claim 2 wherein the insulating layer is held in place by means of encapsulating it between a ply of fabric supporting the conductor and a further layer of fabric stitched to the supporting layer.

12. The system of claim 2 wherein the insulating layer is held in place by means of encapsulating it between a ply of fabric supporting the conductor and a further layer of fabric adhering to the supporting layer.

13. The system of claim 12 wherein the further layer of fabric is self adhesive.

14. The system of claim 12 wherein the adhesive is heat setting.

15. The system of claim 2 wherein the insulating layer is provided by an insulating clip held in place on a supporting ply of fabric.

16. The system of claim 15 wherein the clip is held in place partially or fully by engagement with the conductor.

17. The system of claim 15 wherein the clip consists of a horseshoe shaped spring with 2 opposing plate-like elements.

18. The system of claim 17 wherein one of the elements is in the form of 2 legs with a slot between the legs such that the clip can slide over the shank of a metal stud such that the opposite element of the clip completely covers the back of the stud or the front of the stud and the engagement of the slot with the shank of the stud prevents relative movement.

19. The system of claim 17 wherein one of the elements is in the form of a hook that engages with the shank of a metal stud such that the opposite element of the clip completely covers the back of the stud or the front of the stud and the engagement of the hook with the shank of the stud prevents relative movement.

20. The system of claim 17 wherein surface irregularities are formed on at least one of the inside surfaces of the two opposing elements in order to increase the frictional force between the clip and the supporting fabric so as to prevent relative movement.

21. The system of claim 20 wherein the surface irregularities are serrations configured such that the clip will slide onto the supporting fabric easily but will resist movement in the opposite direction.

22. The system of claim 15 wherein the clip is made from a strong and stiff plastic.

23. The system of claim 15 wherein the clip is manufactured in a range of colours in order that they can be used with different coloured clothing.

24. The system of claim 15 wherein the clip is patterned, embossed or printed.

* * * * *